(12) United States Patent
Pickens

(10) Patent No.: US 7,188,854 B1
(45) Date of Patent: Mar. 13, 2007

(54) MOTORCYCLE JACK

(75) Inventor: Howard Pickens, 812 N. Joyce, Ulysses, KS (US) 67880

(73) Assignees: Howard Pickens, Ulysses, KS (US); Tim Cantrell, Ulysses, KS (US)

( * ) Notice: Subject to any disclaimer, the term of this patent is extended or adjusted under 35 U.S.C. 154(b) by 115 days.

(21) Appl. No.: 11/036,581

(22) Filed: Jan. 14, 2005

(51) Int. Cl.
*B62J 25/00* (2006.01)

(52) U.S. Cl. ........................ 280/293; 254/131

(58) Field of Classification Search ............ 280/288.4, 280/293, 296, 298; 254/131, 243, 376
See application file for complete search history.

(56) References Cited

U.S. PATENT DOCUMENTS

| | | | | |
|---|---|---|---|---|
| 4,420,164 A | * | 12/1983 | Mitchell | 280/293 |
| 5,118,126 A | * | 6/1992 | Yaple | 280/293 |
| 5,639,067 A | * | 6/1997 | Johnson | 254/131 |
| 6,302,378 B1 | * | 10/2001 | Koch et al. | 254/131 |
| 7,000,901 B1 | * | 2/2006 | VanValkenburgh | 254/131 |

* cited by examiner

*Primary Examiner*—Lesley D. Morris
*Assistant Examiner*—L. Lum
(74) *Attorney, Agent, or Firm*—Kenneth H. Jack; Davis & Jack, L.L.C.

(57) ABSTRACT

A motorcycle jack having a "C" channel beam, the "C" channel beam having a web and having left and right flanges, the web having an upper end, the left flange having a first pin receiving aperture therethrough, the right flange having a second pin receiving aperture therethrough; a lift arm having a third pin receiving aperture therethrough and having an upper end; a pivot pin extending through the first, second, and third pin receiving apertures, the lift arm being pivotable between first and second positions, the lift arm being housed between the "C" channel beam's left and right flanges while in the first position, the lift arm contacting the "C" channel beam's web's upper end while in the second position; and a motorcycle hub engaging bar pivoting attached to the upper end of the lift arm.

13 Claims, 5 Drawing Sheets

US 7,188,854 B1

MOTORCYCLE JACK

FIELD OF THE INVENTION

The instant invention relates to machinery and apparatus for lifting motorcycles. More particularly, the instant invention relates to apparatus especially adapted for raising motorcycle rear wheels.

BACKGROUND OF THE INVENTION

When not being ridden, motorcycles are commonly stored while resting upon front and rear tires, the motorcycle typically being canted slightly leftwardly, and being held against leftward toppling by a cantilevered and pivotable ground biasing kick stand. Commonly, such motorcycles have a chain or belt drive which require periodic thorough inspections for damage and defects and, in the case of chain drives, require periodic lubrication. Thorough inspection and lubrication of belts and chains requires exposure to view and access to the complete circuit or loop of the belt or chain. Such exposure requires rotation of the motorcycle's rear wheel and rear drive sprocket in order to cycle the chain or belt through a complete turn. While a motorcycle is situated as described above, resting at three ground contact points upon its front tire, rear tire, and kick foot, the rear wheel and rear drive sprocket cannot be rotated. While the motorcycle's rear wheel is locked against rotation by ground contact, cycling of the belt and chain for inspection or lubrication of the complete loop of the belt or chain is difficulty performed. Accordingly, it is desirable to provide a lifting mechanism for raising a motorcycle so that the motorcycle's rear wheel may clear the ground, allowing for rotation of the rear wheel drive sprocket and chain.

Various jacking mechanisms for raising a motorcycle's rear wheel are known. However, such mechanisms are typically over sized and are not compactly stored. Additionally, such mechanisms are typically bulky and unwieldy; they are commonly mechanically complex; and such mechanisms typically are not economically fabricated.

The instant invention solves or ameliorates problems discussed above by providing a motorcycle jack which is collapsible to a compact storage configuration, which is light and mechanically simple, and which may be economically fabricated.

BRIEF SUMMARY OF THE INVENTION

The instant inventive motorcycle jack preferably comprises a base arm, a lift arm, pivotable attaching means interconnecting an upper end of the base arm with a lower end of the lift arm, and motorcycle engaging means fixedly attached to the upper end of the lift arm. In use of the instant inventive motorcycle jack, the base arm and lift arm are preferably oriented with respect to each other to form a forwardly opening obtuse angle, the forward direction being toward a motorcycle to be lifted. Thereafter, the lower end of the base arm is placed against the ground near the point of contact between the motorcycle's rear tire and the ground, and the motorcycle engaging means is engaged with a structurally solid point upon the side of the motorcycle, preferably at or near the motorcycle's rear wheel hub.

Thereafter, a forwardly directed and downwardly driving force is applied to the motorcycle jack at or near the jack's pivot point. Such force rearwardly counter-rotates the base arm and lift arm with respect to each other, driving apart the lower end of the base arm and the upper motorcycle engaging means, lifting the rear wheel of the motorcycle off of the ground. Upon completion of such lifting operation, the motorcycle, which initially rested upon its front and rear tires and kick stand, newly rests upon the lower end of the base arm of the jack in place of the rear tire. While the motorcycle remains so lifted, the rear wheel and rear sprocket may freely turn, allowing for complete access to the motorcycle's belt or chain for inspection or maintenance.

A preferred means for pivotably connecting the upper end of the base arm of the instant inventive jack to the lower end of the lift arm comprises a first pin and eyed clevis joint, such joint preferably having left and right forwardly extending arms, the proximal ends of such arms being interconnected by a base, the base having an upper end. Where such preferred pin and eyed clevis pivotal attaching means is provided, the eyes of such joint preferably extend laterally through distal ends of the arms, and through the lower end of the lift arm, allowing such eyes to be aligned for lateral receipt of a pivot pin. The preferred pin and eyed clevis pivotal attaching means advantageously enables the base arm and the lift arm to pivot and counter-pivot with respect to each other between a first compact storage position wherein the lift arm extends downwardly along the base arm and the forwardly opening obtusely angled orientation discussed above. Such means preferably further enables such arms to further pivot to a slightly rearwardly and obtusely opening over center angle. At such over center angle, the lift arm preferably contacts the upper end of the pin and eyed clevis joint's base, such contact serving as an hyperextension stop. At such over center angular orientation of the instant inventive jack (i.e., wherein longitudinal axes extending from lower end of the base arm to the pivot pin, and extending from the pivot pin to the motorcycle engaging means form an obtuse angle), the base arm and the lift arm occupy a mechanically defined second position. While the jack is in such second position, load forces applied by the above referenced exemplary motorcycle tend to hyperextend the base arm with respect to the lift arm while localized compressive contact between the lift arm and the upper end of the pin and eyed clevis's base tend to act as a pivot stop. Accordingly, while the base arm and lift arm occupy such over center angle orientation, load forces applied by the motorcycle advantageously lock the jack in its raised position, preventing any unexpected or undesirable falling or toppling of the motorcycle and jack.

Suitably, though less desirably, other pivotal attaching means such as leaf hinges or clevis and journal lug hinges may alternately serve as the pivotal attaching means.

A preferred motorcycle engaging means comprises a steel bar which may be closely fitted for lateral insertion into a motorcycle's laterally opening rear wheel axle channel. Where such preferred steel bar motorcycle engaging means is provided, second pivotal attaching means are also preferably provided for pivotally interconnecting the upper end of the lift arm and a rearward end of the bar. Such second pivotal attaching means is preferably configured similarly with the first pivotal attaching, such means preferably comprising a second pin and eyed clevis joint, including forwardly extending left and right arms interconnected at their proximal ends by a base. The eyes of such second pin and eyed clevis joint preferably extend laterally through distal ends of such joint's arms and through the rearward end of the bar for lateral alignment and receipt of a pivot pin therethrough. Where such preferred second pin and eyed clevis joint is provided, the second longitudinal axis referred to above is recognized as extending from the pivot pin of the first pin and eyed clevis joint to the pivot pin of the second pin and eyed clevis joint.

Like the first pivotal attaching means, pivoting means other than the preferred second pin and eyed clevis joint may be suitably substituted.

The motorcycle engaging means element of the instant inventive jack may alternately comprise a yoke or cradle which is fitted for receipt of a structurally sound laterally protruding structure of a motorcycle. Such yoke or cradle motorcycle engaging means, when alternately provided, is preferably fixedly attached to the upper end of the lift arm.

For facilitation of height adjustability of the instant inventive motorcycle jack, and assuming that the preferred steel bar motorcycle engagement member and second pin and eyed clevis configurations are provided, a plurality of height adjustment pivot pin receiving apertures preferably extend laterally through the arms of the first and second pin and eyed clevis joints. Such alternate pin receiving apertures advantageously facilitate adjustable vertical positioning of the pivot points of the motorcycle jack and adjustment of the operational height of the jack.

For purposes of compact storage, and assuming a provision of the preferred pivoting steel bar motorcycle engaging means as described above, such steel bar preferably pivots similarly with the lift arm, pivoting from a third position wherein the steel bar extends along the lift arm to a fourth position wherein the steel bar extends forwardly for nesting receipt within a motorcycle's rear wheel hub axle channel.

In the preferred configuration of the instant inventive motorcycle jack, the base arm and the lift arm comprise "C" channel beams having forwardly extending left and right flanges interconnected by webs. In such configuration, the upper ends of the flanges of the base arm "C" channel beam advantageously serve as the left and right arms of the preferred first pin and eyed clevis joint attaching means, and the upper ends of the left and right flanges of the lift arm "C" channel beam similarly advantageously serve as the left and right arms of the preferred second pin and eyed clevis joint pivotal attaching means. Where the flanges of such "C" channel beams serve as the arms of pin and eyed clevis joints, the elongated extensions of such flanges advantageously further serve functions of compactly housing the preferred steel bar motorcycle engaging means, and housing the lift arm. Where the preferred "C" channel beam configuration is provided, the upper end of the web of the base arm "C" channel beam (which mechanically coincides with the upper end of the base of the first pin and eyed clevis joint) preferably serves as an over center hyper-extension stop similarly with the function of the clevis base discussed above.

Accordingly, objects of the instant inventive motorcycle jack include the provision of structures configured as described above which are capable of performing functions as described above.

Other and further objects, benefits, and advantages of the present invention will become known to those skilled in the art upon review of the Detailed Description which follows, and upon review of the appended drawings.

DETAILED DESCRIPTION OF A PREFERRED EMBODIMENT

Figure 1:
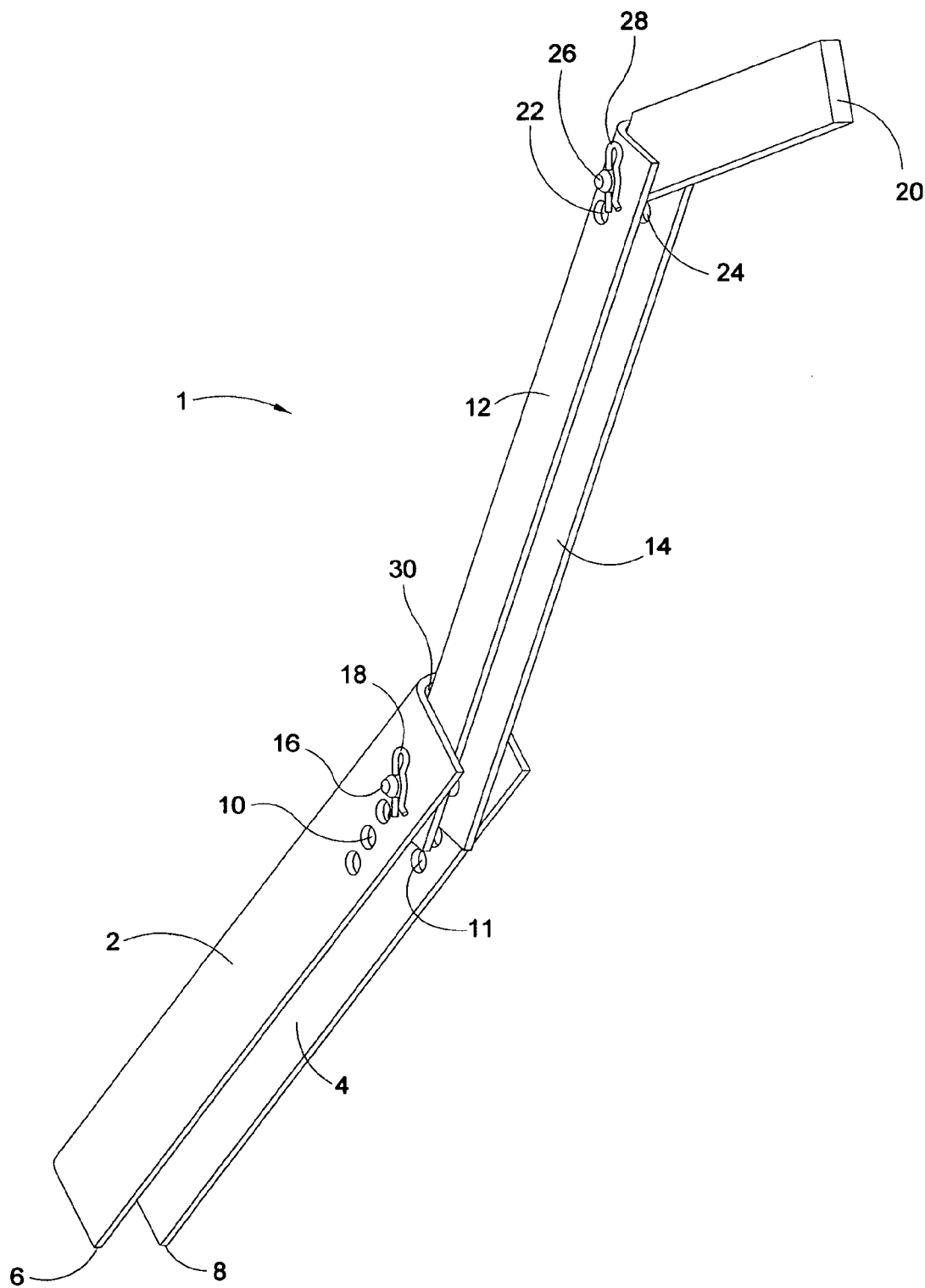
FIG. 1 is an isometric view of a preferred embodiment of the instant inventive motorcycle jack, the view showing the jack in its fully extended use configuration.

Referring now to the drawings, and in particular to FIG. 1, the instant inventive motorcycle jack is referred to generally by Reference Arrow 1. The motorcycle jack 1 has a base arm which preferably comprises a "C" channel beam having forwardly extending right and left flanges 2 and 4, the proximal ends of such flanges being interconnected by, referring further to FIG. 3, a web 5, the web 5 having an extreme upper end 30. The upper portions of flanges 2 and 4 advantageously function as left and right clevis arms while the web 5 of the base arm "C" channel beam advantageously serves as a clevis base interconnecting proximal ends of such flanges/arms 2 and 4. The downwardly elongated extensions of such clevis arms or "C" channel beam flanges 2 and 4 advantageously further function to nestingly receive and compactly store other structural members of the jack upon pivotal collapsing to the configuration depicted in FIG. 2.

Referring again to FIG. 1, the lower ends of flanges 2 and 4 preferably form sharply angled ground contacting ends 6 and 8 for prevention of slipping of such points upon paved surfaces.

Referring further to FIG. 1, flanges 2 and 4 preferably further include a plurality of right and left height adjustment pin receiving apertures 10 and 11.

Figure 2:
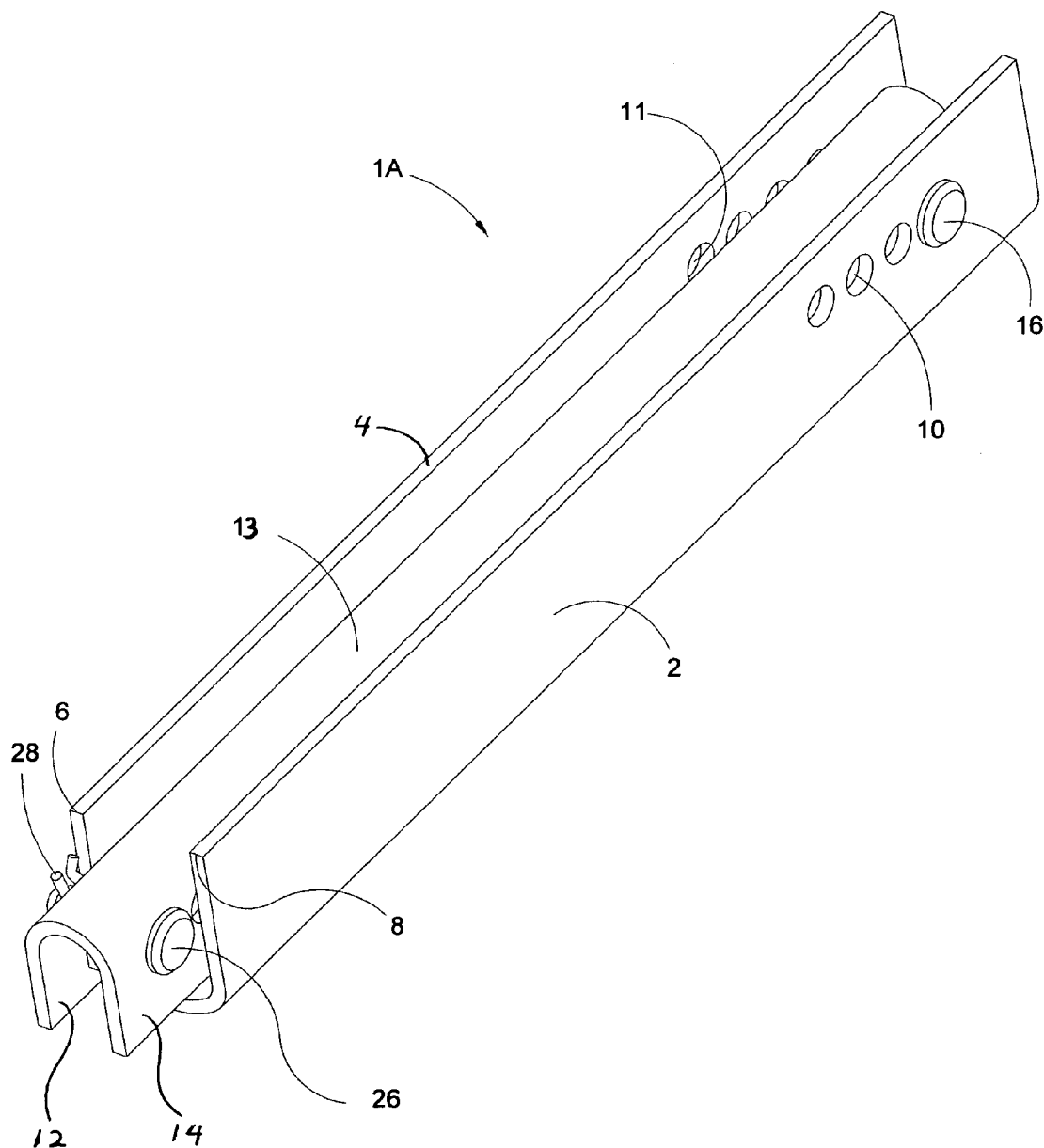
FIG. 2 redepicts the motorcycle jack of FIG. 1, the view showing the motorcycle jack in its fully collapsed storage configuration.

Referring further to FIG. 1, a lift arm preferably comprising a second "C" channel beam having right and left arms 12 and 14 and having, referring further to FIG. 2, a web 13 is preferably provided. The lower end of the lift arm "C" channel beam preferably is laterally eyed or apertured, allowing a first pivot pin 16 to extend simultaneously laterally through a pair of apertures 10 and 11 within flanges 12 and 14, and through a pair of apertures extending through the lower end of the lift arm. Preferably, the pivot pin 16 is releasably locked in place by a lock pin 18 which extends through a lock pin receiving aperture extending through the foot of pivot pin 16.

Referring further to FIG. 1, a steel bar 20 is preferably pivotally attached in the manner of a pin and eyed clevis joint to the upper end of the lift arm, the pivotal attachment comprising a pivot pin 26 which extends simultaneously through an aperture within the proximal end of bar 20 and through a pair of the eyes 22 and 24. Like pivot pin 16, pivot pin 26 is preferably releasably locked into place by a lock pin 28 which extends through a lock pin receiving aperture within the foot of pivot pin 26.

Figure 3:
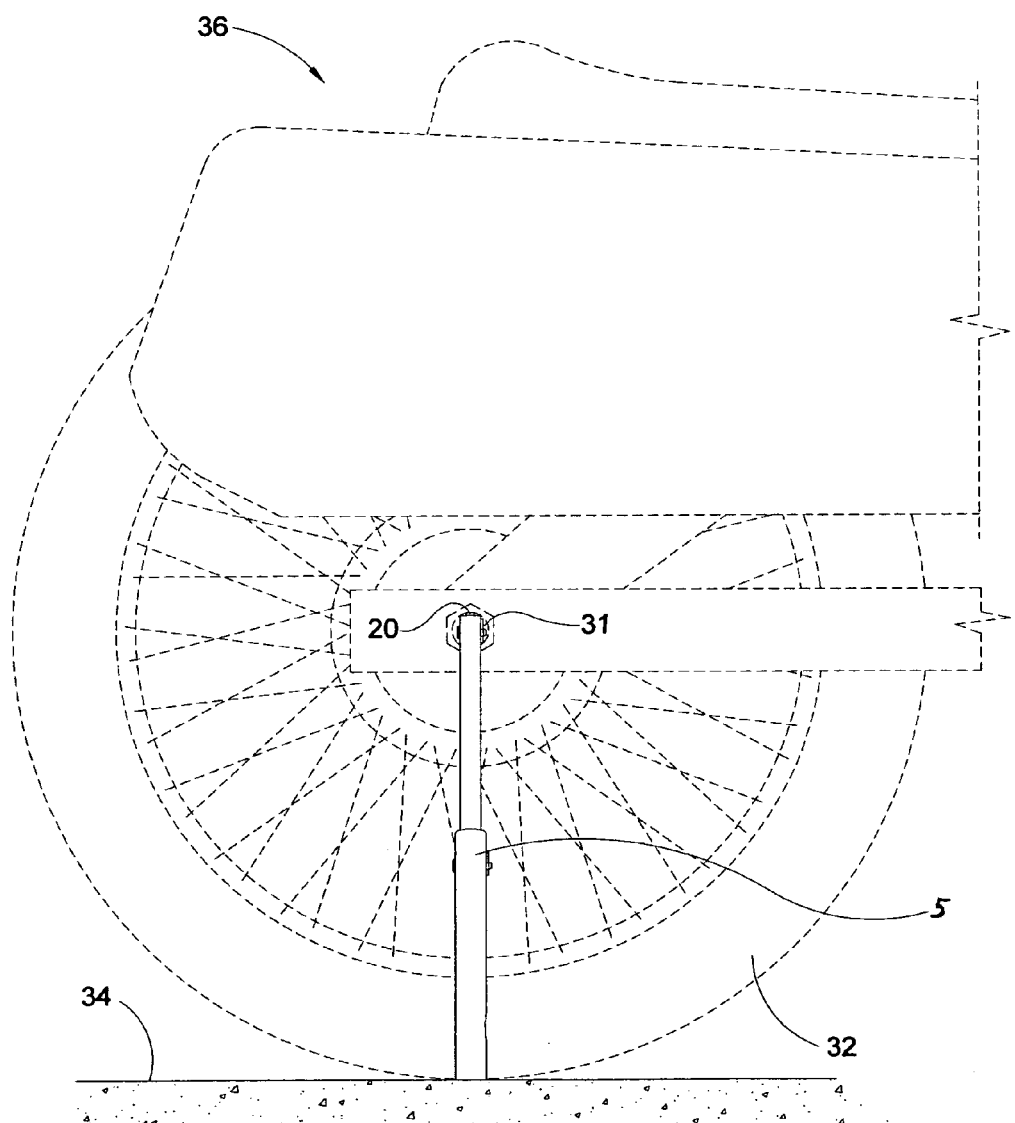
FIG. 3 depicts a side view of the inventive motorcycle jack in an initial step of use upon a motorcycle partially shown in ghost.

Referring simultaneously to FIGS. 1, 2, and 3, the instant inventive motorcycle jack has first and second longitudinal axes, the first longitudinal axis extending generally from the elevation and location of ground contact points 6 and 8 to pivot pin 16, and the second longitudinal axis extending generally from pivot pin 16 to pivot pin 26. Upon counter-clockwise pivoting movement of the lift arm "C" channel beam to the orientation at which the web 13 of the lift arm "C" channel beam contacts the upper end 30 of the web 5 of the base arm "C" channel beam, a rearwardly opening obtuse or over center angle is advantageously formed between said two longitudinal axes, such over center angle allowing a downwardly directed load force applied to the jack 1 to lock the jack in its extended position.

Referring simultaneously to FIGS. 1 and 2, the collapsed configuration of the motorcycle jack 1 is referred to generally by Reference Arrow 1A. Upon clockwise pivoting motion of the motorcycle hub engaging bar 20 from its forwardly extended orientation as depicted in FIG. 1, to a position wherein the bar 20 extends along the lift arm "C" channel beam and is laterally flanked by flanges 12 and 14, the bar 20 is compactly stored and housed between flanges 12 and 14. Upon successive clockwise pivoting motion of the "C" channel beam lift arm from the position depicted in FIG. 1 to the position depicted in FIG. 2, both the lift arm "C" channel beam and the bar 20 are advantageously compactly stored between the flanges 2 and 4 of the base arm "C" channel beam. While the inventive motorcycle jack occupies its compact storage configuration 1A as depicted in FIG. 2, the jack may be conveniently stored within a motorcycle's underseat storage compartment or within a motorcycle's saddle bag.

Figure 4:
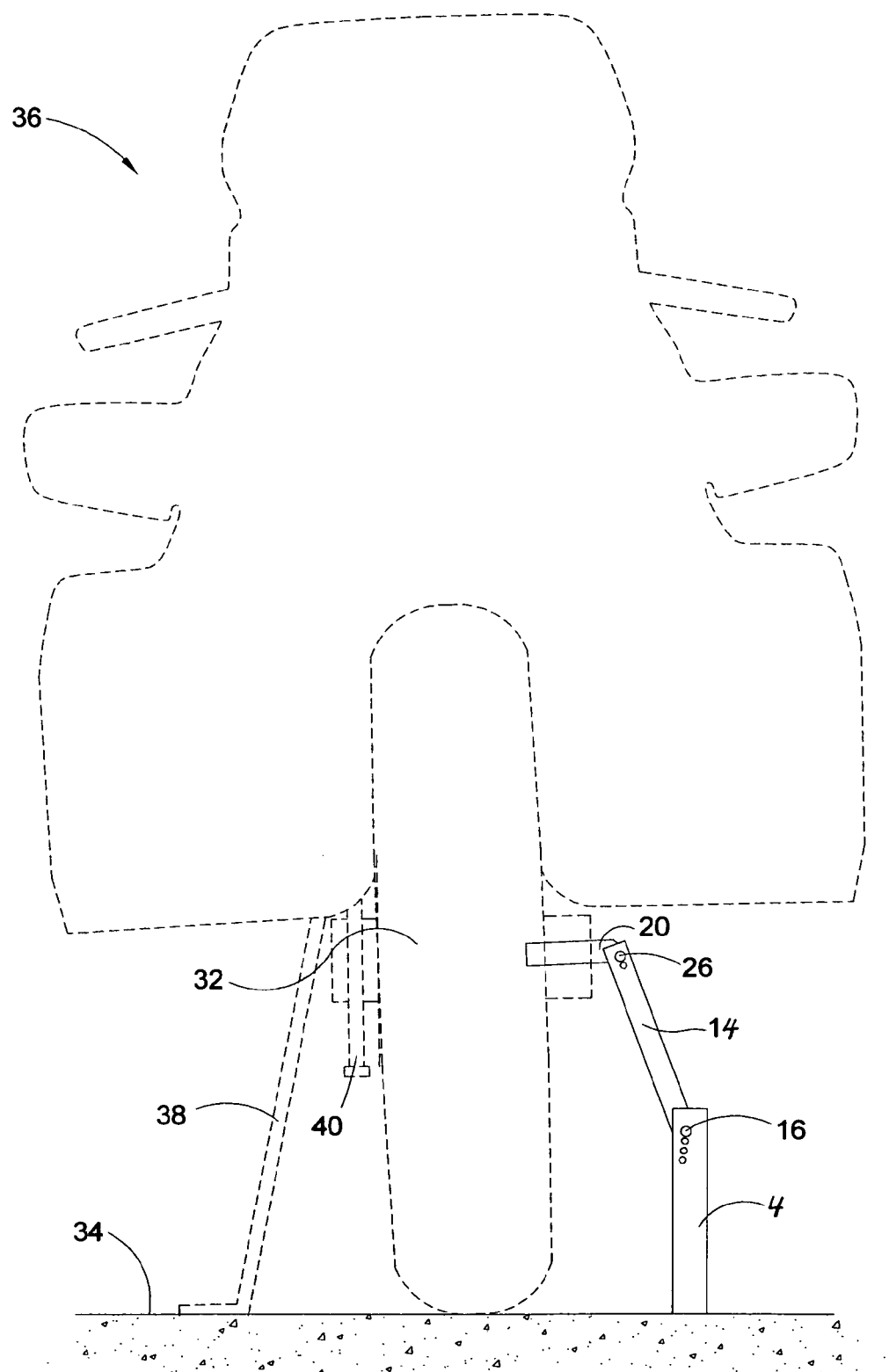
FIG. 4 redepicts FIG. 3 in rear view.

In operational use of instant inventive motorcycle jack, referring simultaneously to FIGS. 2, 3, and 4, the motorcycle jack 1A may be manually pivotally extended until its base arm and lift arm assume a forwardly opening obtuse angle configuration as depicted in FIG. 4. Thereafter, the lower end of the base arm is placed upon pavement surface 34, as depicted in FIG. 4 at a point in close proximity with the ground contact point of tire 32 of motorcycle 36 with pavement 34. Substantially simultaneously, bar 20 is extended laterally into the motorcycle's rear hub axle channel 31. Thereafter, the operator may utilize hand or foot pressure to drive forwardly and slightly downwardly against, referring further simultaneously to FIG. 1, the upper end 30 of the web 5 of the "C" channel beam base arm. Such driving force tends to rearwardly counter-rotate the lift arm and the base arm with respect to each other. Upon such counter-rotating motion the arms assume, referring further to FIG. 5, the fully extended orientation depicted in FIG. 5. In its raised or extended configuration, contact points 6 and 8 of the motorcycle jack dig into pavement 34 serving as high friction slip stops while upper end 30 of web 5 serves as an hyper-extension stop. The slip stop and hyper-extension stop functionally combine to lock the motorcycle jack in its raised or extended position, raising the rear wheel 32 of the motorcycle 36 and creating a ground clearance gap 42.

Figure 5:
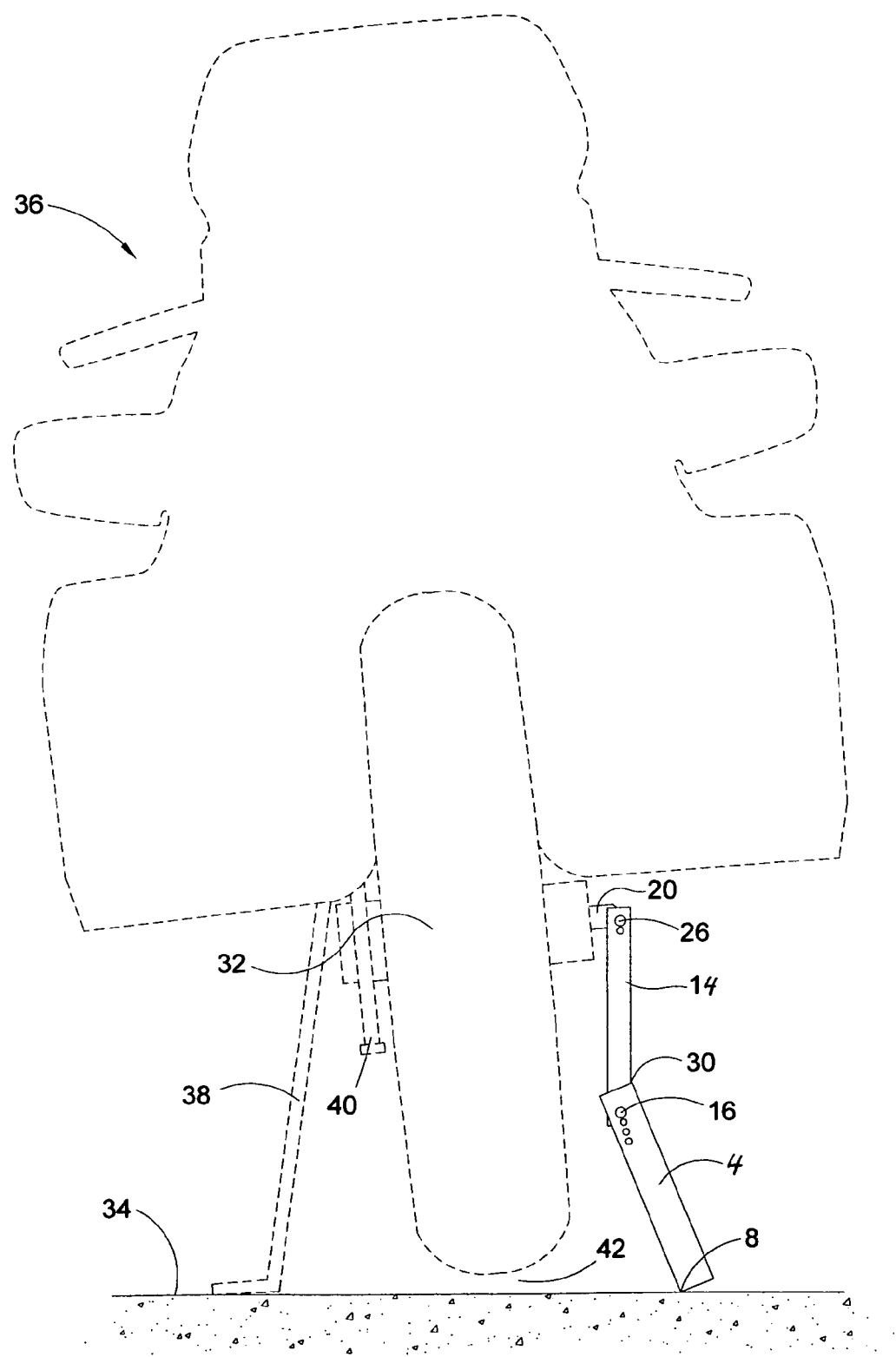
FIG. 5 redepicts FIG. 4, showing the motorcycle jack in a final usage configuration.

While in the raised configuration depicted in FIG. 5, the motorcycle 36 rests upon pavement 34 at three points of contact (i.e., the motorcycle's front tire (not depicted within view), friction points 6 and 8 of the jack, and the foot of the motorcycle's kick stand 38. In such configuration, rear tire 32 may be freely rotated, allowing for complete inspection or lubrication of the motorcycle's chain or belt 40.

Referring further to FIG. 5, in order to remove the inventive motorcycle jack, an operator may press leftwardly against the motorcycle 36, causing the motorcycle to be temporarily supported by the operator in combination with the kick stand and front tire contact points. Upon achieving such support, the motorcycle jack may be freely laterally withdrawn. Thereafter, the motorcycle 36 may be lowered for conventional rear tire support. Thereafter, the motorcycle jack, may be conveniently pivotally reconfigured as depicted in FIG. 2 for compact storage within one of the motorcycle's storage compartments.

While the principles of the invention have been made clear in the above illustrative embodiment, those skilled in the art may make modifications in the structure, arrangement, portions and components of the invention without departing from those principles. Accordingly, it is intended that the description and drawings be interpreted as illustrative and not in the limiting sense, and that the invention be given a scope commensurate with the appended claims.

I claim:

1. A motorcycle jack comprising:
   (a) a first "C" channel beam having a web and having a first left forwardly extending flange and having a first right forwardly extending flange, the web having an upper end, the first left forwardly extending flange having a first pin receiving aperture therethrough, the first right forwardly extending flange having a second pin receiving aperture therethrough;
   (b) a lift arm having a third pin receiving aperture therethrough;
   (c) a first pivot pin extending through the first, second, and third pin receiving apertures, the lift arm being pivotable between first and second positions, the lift arm being housed between the "C" channel beam's first left and right forwardly extending flanges while in the first position, the lift arm contacting the "C" channel beam's web's upper end while in the second position; and
   (d) motorcycle engaging means fixedly attached to the upper end of the lift arm, the lift arm comprising a second "C" channel beam having a second left forwardly extending flange and having a second right forwardly extending flange.

2. The motorcycle jack of claim 1 wherein the second "C" channel beam's left and right forwardly extending flanges respectively have fourth and fifth pin receiving apertures extending therethrough, wherein the motorcycle engaging means comprises a bar having a sixth pin receiving aperture therethrough, and further comprising a second pivot pin extending through the fourth, fifth, and sixth pin receiving apertures.

3. The motorcycle jack of claim 2 wherein the bar is pivotable between third and fourth positions, the bar being housed between the second "C" channel beam's second left and right forwardly extending flanges while in the third position, the bar extending forwardly from the second "C" channel beam while in the fourth position.

4. The motorcycle jack of claim 3 wherein the first "C" channel beam has a ground contacting lower end and has a first longitudinal axis extending from the ground contacting lower end to the first pivot pin, wherein the second "C" channel beam has a second longitudinal axis extending from the first pivot pin to the second pivot pin, and wherein the first and second longitudinal axes form an over center angle while the second "C" channel beam is in the second position.

5. The motorcycle jack of claim 4 further comprising first left and right height adjustment pin receiving apertures respectively extending through the first "C" channel beam's first left and right forwardly extending flanges.

6. The motorcycle jack of claim 5 further comprising second left and right height adjustment pin receiving apertures respectively extending through the second "C" channel beam's second left and right forwardly extending flanges.

7. The motorcycle jack of claim 6 further comprising first and second lock pin receiving apertures and first and second lock pins, the first and second lock pin receiving apertures respectively extending through the first and second pivot pins, the first and second lock pins respectively extending through the first and second lock pin receiving apertures.

8. A motorcycle jack comprising:
(a) a base arm having lower and upper ends;
(b) a lift arm having lower and upper ends;
(c) first pivotable attaching means interconnecting the upper end of the base arm and the lower end of the lift arm, the first pivotable attaching means comprising a first pin and eyed clevis joint;
(d) motorcycle engaging means fixedly attached to the upper end of the lift arm, the motorcycle engaging means comprising a bar, and the fixed attachment of the motorcycle engaging means to the upper end of the lift arm comprising second pivotable attaching means, the second pivotable attaching means comprising a second pin and eyed clevis joint; the first pin and eyed clevis joint comprising first left and right forwardly extending arms and a base spanning between said arms, the base having an upper end, the lift arm being pivotable between first and second positions, the lift arm extending along the base arm while in the first position, the lift arm contacting the base's upper end while in the second position.

9. The motorcycle jack of claim 8 wherein the base arm has a ground contacting lower end and has a first longitudinal axis extending from the ground contacting lower end to the first pin and eyed clevis's pin, wherein the lift arm has a second longitudinal axis extending from the first pin and eye clevis's pin to the second pin and eyed clevis's pin, and wherein the first and second longitudinal axes form an over center angle while the lift arm is in the second position.

10. The motorcycle jack of claim 9 wherein the first pin and eyed clevis's base and first left and right forwardly extending arms are longitudinally elongated for, upon pivoting of the lift arm to the first position, housing the lift arm.

11. The motorcycle jack of claim 10 wherein the bar is pivotable between third and fourth positions, the bar extending along the lift arm while in the third position, the bar extending forwardly while in the fourth position.

12. The motorcycle jack of claim 11 wherein the second pin and eyed clevis comprises second left and right forwardly extending arms and a second base spanning between said arms, wherein the second base and the second left and right forwardly extending arms are longitudinally elongated for, upon pivoting of the bar to the third position, housing the bar.

13. The motorcycle jack of claim 12 further comprising a plurality of height adjusting pin receiving apertures extending through the first and second eyed clevises' first and second left and right forwardly extending arms.

* * * * *